(12) United States Patent
Chinniah et al.

(10) Patent No.: US 9,233,510 B2
(45) Date of Patent: Jan. 12, 2016

(54) LENSES FOR COSINE CUBED, TYPICAL BATWING, FLAT BATWING DISTRIBUTIONS

(71) Applicant: GE Lighting Solutions, LLC, East Cleveland, OH (US)

(72) Inventors: Jeyachandrabose Chinniah, Willoughby Hills, OH (US); Gary Allen, Chesterland, OH (US); Benjamin Yoder, Cleveland Heights, OH (US)

(73) Assignee: GE LIGHTING SOLUTIONS, LLC, East Cleveland, OH (US)

( * ) Notice: Subject to any disclaimer, the term of this patent is extended or adjusted under 35 U.S.C. 154(b) by 260 days.

(21) Appl. No.: 13/947,503

(22) Filed: Jul. 22, 2013

(65) Prior Publication Data

US 2015/0023028 A1    Jan. 22, 2015

(51) Int. Cl.
| | |
|---|---|
| F21V 5/04 | (2006.01) |
| B29D 11/00 | (2006.01) |
| G02B 19/00 | (2006.01) |
| F21Y 101/02 | (2006.01) |

(52) U.S. Cl.
CPC ............ B29D 11/00019 (2013.01); F21V 5/04 (2013.01); G02B 19/0014 (2013.01); G02B 19/0061 (2013.01); F21Y 2101/02 (2013.01)

(58) Field of Classification Search
CPC ...... F21V 5/045; F21V 5/04; B29D 11/00019
See application file for complete search history.

(56) References Cited

U.S. PATENT DOCUMENTS

| | | | |
|---|---|---|---|
| 2,254,962 A * | 9/1941 | Bitner et al. | 362/327 |
| 3,833,802 A | 9/1974 | Fridrich | |
| 6,273,596 B1 | 8/2001 | Parkyn, Jr. | |
| 7,273,299 B2 | 9/2007 | Parkyn et al. | |
| 7,422,347 B2 | 9/2008 | Miyairi | |
| 7,854,536 B2 | 12/2010 | Holder et al. | |
| 7,959,326 B2 | 6/2011 | Laporte | |
| 7,985,009 B2 | 7/2011 | Ho | |
| 8,070,326 B2 | 12/2011 | Lee | |
| 2003/0099115 A1 | 5/2003 | Reill | |

(Continued)

FOREIGN PATENT DOCUMENTS

CN    202065905    12/2011

OTHER PUBLICATIONS

PCT Invitation to Pay Additional Fees issued in connection with corresponding WO Application No. PCT/US2014/043628.

(Continued)

*Primary Examiner* — Elmito Breval
(74) *Attorney, Agent, or Firm* — GE Global Patent Operation; Peter T. DiMauro

(57) ABSTRACT

A lighting apparatus with uniform illumination distribution, according to various embodiments, can include a lens for area lighting. In one embodiment, the lens comprises a plurality of cross-sections identified by a thickness ratio defined at different angles. The thickness ratio is determined relative to the thickness of the cross-section defined at a center angle of the lens. In another embodiment, the lighting apparatus with uniform illumination distribution includes a lens having an inner surface and an outer surface. A profile of the inner surface and the outer surface is composed of a plurality of piecewise circular arcs defined with radii and circle centers. The lens is formed as a complex curve lens by joining the piecewise circular arcs of the inner surface and the outer surface.

13 Claims, 15 Drawing Sheets

(56) References Cited

U.S. PATENT DOCUMENTS

| | | |
|---|---|---|
| 2006/0102914 A1 | 5/2006 | Smits et al. |
| 2007/0201225 A1 | 8/2007 | Holder et al. |
| 2007/0263390 A1* | 11/2007 | Timinger et al. ............ 362/308 |
| 2008/0100773 A1 | 5/2008 | Hwang et al. |
| 2010/0165637 A1 | 7/2010 | Premysler |
| 2011/0141729 A1 | 6/2011 | Yang et al. |
| 2011/0141734 A1 | 6/2011 | Li et al. |
| 2011/0228528 A1 | 9/2011 | Yang et al. |
| 2012/0001554 A1 | 1/2012 | Leadford et al. |
| 2012/0002414 A1 | 1/2012 | Gould |
| 2012/0120666 A1* | 5/2012 | Moeller ..................... 362/308 |
| 2012/0268950 A1* | 10/2012 | Parkyn et al. ................. 362/335 |
| 2012/0287375 A1 | 11/2012 | Matsuki et al. |
| 2013/0229810 A1* | 9/2013 | Pelka et al. .............. 362/311.02 |

OTHER PUBLICATIONS

Park, "Optimal Single Biarc Fitting and its Applications", Computer-Aided Design and Applications, vol. No. 1, Issue No. 1-4, pp. 187-195, Dec. 31, 2004.

PCT Search Report and Written Opinion issued in connection with corresponding PCT Application No. PCT/US2014/043628 on Mar. 11, 2015.

\* cited by examiner

| Outer surface | X | Y | Radius |
|---|---|---|---|
| Arc 1 | 36.936 | 68.232 | 67.916 |
| Arc 2 | 210.226 | 354.344 | 402.415 |
| Arc 3 | -31.309 | -49.114 | 67.817 |
| Arc 4 | -6.300 | -10.100 | 21.476 |
| Arc 5 | 0.702 | -1.030 | 10.018 |
| Arc 6 | 3.849 | 2.119 | 5.566 |
| Arc 7 | 5.770 | 3.382 | 3.266 |
| Arc 8 | 6.248 | 3.531 | 2.768 |
| Arc 9 | 5.115 | 3.790 | 3.929 |
| Arc 10 | 2.709 | 5.098 | 6.667 |
| Arc 11 | -0.552 | 7.690 | 10.833 |

FIG. 3B

| Inner surface | X | Y | Radius |
|---|---|---|---|
| Arc 1 | -4.366 | 3.953 | 6.821 |
| Arc 2 | -7.409 | 2.257 | 10.305 |
| Arc 3 | -13.774 | 0.461 | 16.918 |
| Arc 4 | -23.930 | -0.843 | 27.158 |

FIG. 3C

| Section | Thickness ratios | Angle from horizontal |
|---|---|---|
| $A_1$-$B_1$ | 1 | 90° |
| $A_2$-$B_2$ | 1.2206 | 80° |
| $A_3$-$B_3$ | 1.6569 | 70° |
| $A_4$-$B_4$ | 2.1078 | 60° |
| $A_5$-$B_5$ | 2.5196 | 50° |
| $A_6$-$B_6$ | 2.8824 | 40° |
| $A_7$-$B_7$ | 3.1255 | 30° |
| $A_8$-$B_8$ | 3.0490 | 20° |
| $A_9$-$B_9$ | 2.5441 | 10° |
| $A_{10}$-$B_{10}$ | 1.9167 | 0.83° |

| Outer surface | X | Y | Radius |
|---|---|---|---|
| Arc 1 | 1.443 | -27.468 | 33.310 |
| Arc 2 | 1.904 | -7.784 | 13.623 |
| Arc 3 | 3.282 | 1.879 | 3.862 |
| Arc 4 | 3.804 | 2.882 | 2.749 |
| Arc 5 | -31.630 | -11.952 | 41.109 |

FIG. 6B

| Inner surface | X | Y | Radius |
|---|---|---|---|
| Arc 1 | 0.064 | 1.128 | 3.048 |
| Arc 2 | -1.552 | -3.112 | 7.584 |
| Arc 3 | 0.423 | 0.220 | 3.711 |
| Arc 4 | 5.806 | 3.055 | 2.660 |
| Arc 5 | 5.863 | 3.172 | 2.766 |
| Arc 6 | 8.155 | 5.840 | 6.284 |
| Arc 7 | 12.463 | 12.696 | 14.380 |

FIG. 6C

| Section | Thickness ratios | Angle from horizontal |
|---|---|---|
| $A_1$-$B_1$ | 1 | 90° |
| $A_2$-$B_2$ | 1.0776 | 80° |
| $A_3$-$B_3$ | 1.2775 | 70° |
| $A_4$-$B_4$ | 1.5593 | 60° |
| $A_5$-$B_5$ | 1.8545 | 50° |
| $A_6$-$B_6$ | 2.0324 | 40.6° |
| $A_7$-$B_7$ | 2.1014 | 27.7° |
| $A_8$-$B_8$ | 2.0104 | 20° |
| $A_9$-$B_9$ | 1.7763 | 10° |
| $A_{10}$-$B_{10}$ | 1.2182 | 0° |

FIG. 7B

| Outer surface | X | Y | Radius |
|---|---|---|---|
| Arc 1 | 0.313 | -6.059 | 12.412 |
| Arc 2 | 0.960 | -1.834 | 8.139 |
| Arc 3 | 2.065 | 1.038 | 5.063 |
| Arc 4 | 1.646 | 0.824 | 5.500 |
| Arc 5 | 35.192 | 11.607 | 29.839 |

FIG. 10B

| Inner surface | X | Y | Radius |
|---|---|---|---|
| Arc 1 | 0.000 | 0.000 | 4.175 |
| Arc 2 | 5.666 | 3.015 | 2.516 |
| Arc 3 | 6.753 | 4.018 | 3.989 |
| Arc 4 | 11.577 | 11.129 | 12.581 |

FIG. 10C

| Section | Thickness ratios | Angle from horizontal |
|---|---|---|
| $A_1$-$B_1$ | 1 | 90° |
| $A_2$-$B_2$ | 1.0350 | 80° |
| $A_3$-$B_3$ | 1.1146 | 70° |
| $A_4$-$B_4$ | 1.2278 | 60° |
| $A_5$-$B_5$ | 1.3470 | 50° |
| $A_6$-$B_6$ | 1.4243 | 40.6° |
| $A_7$-$B_7$ | 1.5821 | 27.7° |
| $A_8$-$B_8$ | 1.4795 | 20° |
| $A_9$-$B_9$ | 1.2959 | 10° |
| $A_{10}$-$B_{10}$ | 0.9171 | 0° |

FIG. 11B

LENSES FOR COSINE CUBED, TYPICAL BATWING, FLAT BATWING DISTRIBUTIONS

I. FIELD OF THE INVENTION

The present disclosure relates generally to light emitting diode (LED) lighting. More particularly, the present disclosure relates to an LED lens producing uniform illuminance on a flat surface.

II. BACKGROUND OF THE INVENTION

In recent years, as their power and efficiency have increased and their cost decreased, LEDs have been used in many applications as viable replacements to conventional fluorescent lamps, incandescent lamps, neon tubes and fiber optic light sources. LED lighting systems can be employed in a variety of environments to illuminate a flat surface, such as street lighting, a parking lot, a parking garage, a roadway, a walkway, a sidewalk, an aisle, a hallway, a table, a stage, a room, a manufacturing facility, a warehouse, and other types of environments.

In applying these lights to these environments, a multitude of factors influences the choice of equipment, placement of fixtures, and degrees of illumination appropriate to the structures, terrain, and after-hours activity. Based on the LED lens selected for a particular application, hot spots of non-uniform light intensity, which are apparent to the eye human, can be created. A poor lighting design can create blinding spots of glare that cast shadows, creating an eyesore and a number of safety and security hazards. Thus, security ranks as a top concern for business owners having a commercial lighting system installed.

For example in a parking lot lighting system, visibility constitutes a major factor in every design. Parking lot lighting systems are actually regulated by the government, and by law must produce a minimum of four foot candles of light. Neglecting this element not only places drivers and pedestrians at risk in the parking lot, it can create for the business owner liability in the form of possible government fines and legal liability should an unfortunate incident occur on the premises due to poor visibility.

Thus, the optical specifications within the design of a lighting system typically identify application-specific radiation patterns required to be produced by the selected light source. For example, in some lighting applications, such as street lighting, parking garage lighting and walkway lighting, uniform illumination output from the light source is desired in order to uniformly illuminate the entire area.

However, this requirement may be difficult to attain when the target area has widely varying distances. To achieve uniform illumination over the entire area, it is necessary to tailor the intensity of the LED lens by increasing the intensity towards the more distant parts of the area, relative to the closest parts of the area.

For producing uniform illuminance on a flat surface, the ideal intensity distribution is given by an inverted cosine cube law ($1/\cos^3 \theta$, variation where $\theta$ is the angle measured from the vertical direction of the lamp). Amplitude may change depending upon the power source, but the distribution shape still follows the inverted cosine cube law. An exact lens having the characteristics of "ideal" uniform illuminance cannot be produced.

Rather, some conventional techniques approach uniform illuminance without actually achieving "ideal" uniform illuminance. One such conventional technique is a batwing beam pattern, which is commonly used for illuminating a flat surface. The batwing pattern may be defined by having two roughly equal peaks in a candela distribution plot with a valley between the peaks at about 0 degrees. Some LED lamps that radiate the batwing intensity distribution can produce uniform illuminance, but none can produce an intensity distribution that follows the inverted cosine cube law.

III. SUMMARY OF THE EMBODIMENTS OF THE INVENTION

Given the aforementioned deficiencies, a need remains for a lens that gives a uniform illuminance intensity profile substantially similar to the inverted cosine cube distribution.

Furthermore, when components of traditional light sources, such as fluorescent lamps, break down and require replacement, repair of the fluorescent light can be costly in terms of both parts and labor. Also, disposal of fluorescent lamps raises environmental issues, because they contain mercury. To address the problems associated with fluorescent lamps, LED lamps provide a more efficient and environmental friendly light source than fluorescent lamps.

Therefore, there remains a need for improved lighting systems that can produce uniform illuminance on a flat surface in both retrofit and new applications. There remains a need for lenses designed for illumination by LEDs having a design that will produce uniform illumination on flat surfaces. However, some lighting applications may not require ideal uniform illumination as expressed by the inverted cosine cube law. In fact, it may be the type of application for the lighting system that determines whether a lens having parameters based on the inverted cosine law is to be preferred.

Therefore, a different lens may be selected for the specific application. Thus, there is a need for lenses having a cross-section profile defined in terms of the desired light distribution of the LED. Further, there is a need for a single lens design methodology capable of producing several different configured lenses having different intensity distributions that may be employed in a variety of environments.

In one embodiment, the present disclosure describes a lens that provides a near perfect $1/\cos^3$ intensity distribution up to 65 degrees. In another embodiment, the present disclosure describes a lens that provides a standard batwing distribution also with a 60 degree cut-off angle. In a further embodiment, the present disclosure describes a lens that provides flat batwing distribution with a 60 degree cut-off angle. In a particular application, the accuracy with which the illuminance of the lens needs to be may be used to determine which lens to use.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

IV. BRIEF DESCRIPTION OF THE DRAWINGS

FIG. 3B is an exemplary table of the data for the outer surface of the uniform illuminance distribution lens of FIG. 3A;

FIG. 3C is an exemplary table of the data for the inner surface of the uniform illuminance distribution lens of FIG. 3A;

FIG. 6B is an exemplary table of the data for the outer surface of the batwing lens design of FIG. 6A;

FIG. 6C is an exemplary table of the data for the inner surface of the batwing lens design of FIG. 6A;

FIG. 7B is an exemplary table of the data for the thickness ratio of the batwing lens design of FIG. 7A;

FIG. 10B is an exemplary table of the data for the outer surface of the flat batwing lens design of FIG. 10A;

FIG. 10C is an exemplary table of the data for the inner surface of the flat batwing lens design of FIG. 10A;

FIG. 11B is an exemplary table of the data for the thickness ratio of the flat batwing lens design of FIG. 11A.

Figure 1:
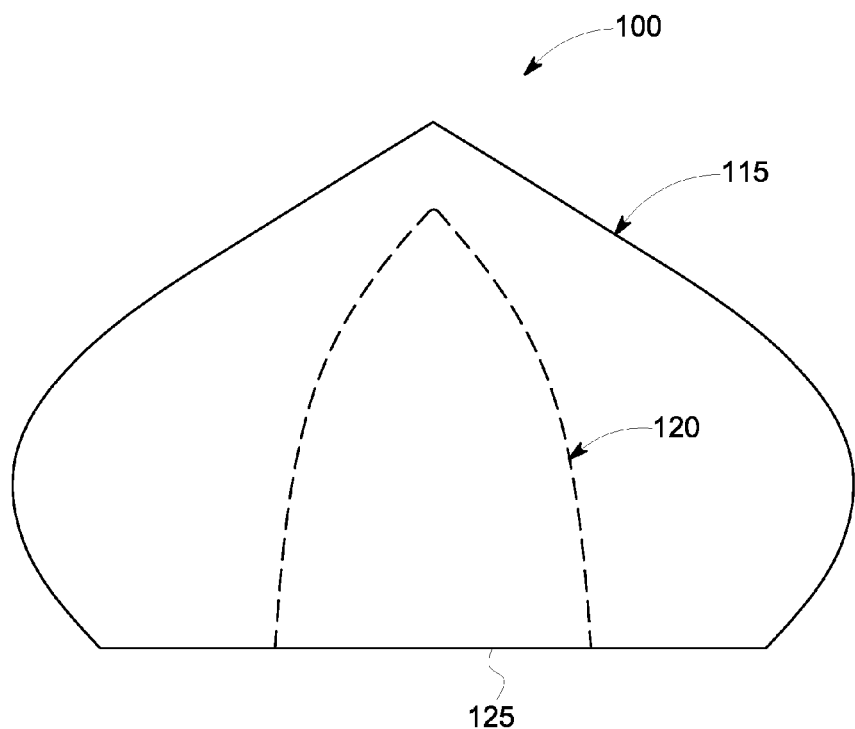
FIG. 1 is a cross-sectional view of a uniform illuminance distribution lens in accordance with the present disclosure.

The present disclosure may take form in various components and arrangements of components, and in various process operations and arrangements of process operations. The present disclosure is illustrated in the accompanying drawings, throughout which, like reference numerals may indicate corresponding or similar parts in the various figures. The drawings are only for purposes of illustrating preferred embodiments and are not to be construed as limiting the disclosure. Given the following enabling description of the drawings, the novel aspects of the present disclosure should become evident to a person of ordinary skill in the art.

V. DETAILED DESCRIPTION OF VARIOUS EMBODIMENTS

While the present invention is described herein with illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

The following detailed description is merely exemplary in nature and is not intended to limit the applications and uses disclosed herein. Further, there is no intention to be bound by any theory presented in the preceding background or summary or the following detailed description.

Various embodiments of the present disclosure provide several approaches to designing lighting systems that may be employed in a variety of environments to provide uniform illuminance to light flat surfaces. It should be understood that the light sources may be configured for a variety of illumination applications. An "illumination source" is a light source that is particularly configured to generate radiation having a sufficient intensity to effectively illuminate an interior or exterior space. The system and method may be configured for various flat surface applications, such as street lighting, a parking lot, a parking garage, a roadway, a walkway, a sidewalk, an aisle, a hallway, a table, a stage, a room, a manufacturing facility, a warehouse, and other types of environments.

At least two principal approaches to providing uniform illuminance on a flat surface are disclosed herein: a piecewise approach and a thickness ratio approach. Both approaches produce uniform luminance based on the lens geometry (i.e., the shape of the lens) as shown in FIGS. 1, 5, and 9.

In the piecewise approach, the embodiments provide an approximation to divide an intensity distribution curve into segments. This is shown in FIGS. 3A-3C, 6A-6C, and 10A-10C. Each lens provides a different intensity distribution appropriate for area lighting and has inner and outer surfaces composed of piecewise circular arcs.

In the thickness ratio approach, the embodiments define the curvature or the depth of the lens as a function of the thickness of the lens at different angles along an optical axis. This is shown in FIGS. 4A-4B, 7A-7B, and 11A-11B.

Figure 9:
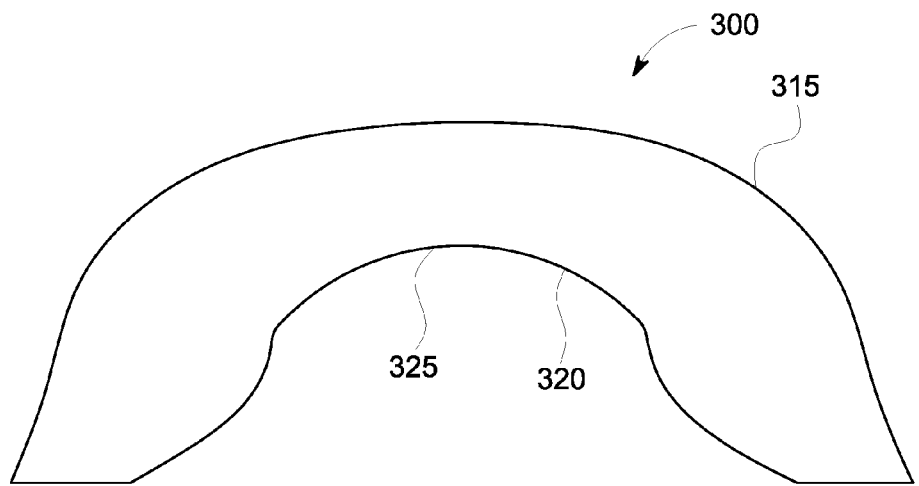
FIG. 9 is a cross-sectional view of a flat batwing distribution lens in accordance with the present disclosure.

Both approaches provide lens design techniques to create different shaped lenses producing different types of intensity distribution, such as uniform illuminance intensity distribution (FIG. 1), batwing intensity distribution (FIG. 5), and flat batwing intensity density (FIG. 9). Each lens in FIGS. 1, 5, and 9 is created based on the same principles, but having different geometries such that the light is controlled differently in each embodiment. Namely, the principle of constructing the lenses is the same, but the curvature of each lens is different to create a different distribution. The embodiments produce the desired luminance based on the lens geometry.

In one embodiment shown in FIGS. 1-4B, the present disclosure describes a lens that provides a near perfect 1/cos^3 intensity distribution up to 65 degrees. In a street lighting application, for example, this lens will provide perfect uniform illuminance on the road surface up to 65 degrees.

In another embodiment as shown in FIGS. 5-8, the present disclosure describes a lens that provides a standard batwing distribution with a 60 degree cut-off angle.

In a further embodiment as shown in FIGS. 9-12, the present disclosure describes a lens that provides flat batwing distribution with a 60 degree cut-off angle. In a particular application, the desired accuracy of the illuminance of the lens may be used to determine which lens to use.

In FIGS. 1-4B, exemplary embodiments of a uniform illuminance lens 100, providing a near perfect 1/cos^3 intensity distribution up to 65 degrees, are shown. It is well known that the shape of the intensity distribution from the light source required to achieve "ideal" uniform illuminance is given by the inverted cosine cube law ($1/\cos^3 \theta$, variation where $\theta$ is the angle measured from the vertical direction of the lamp).

Light amplitude may change depending upon the power source, but the distribution shape of the lens 100 still follows the inverted cosine cube law. The distribution is ideal in the sense that it will illuminate a plane surface uniformly. However, a lens having ideal uniform illuminance intensity cannot be produced. Attempts have been made to create an ideal lens.

Such a lens cannot be produced without slight deviations within the lens. These deviations are imperceptible to the human eye.

Figure 2:
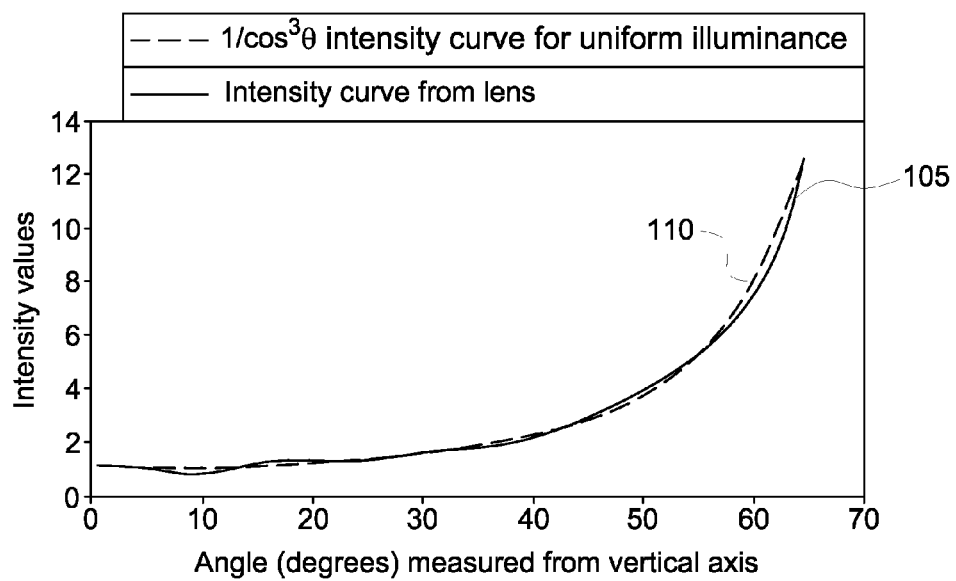
FIG. 2 is a graph showing intensity distribution for the uniform illuminance distribution lens of FIG. 1.

According to the embodiments, to be able to obtain an acceptable lens, a lens 100 is provided that follows the inverted cosine cube law as closely as possible. FIG. 2 is a plot of light intensity versus angle measured from a vertical axis. FIG. 2 compares an intensity curve 105 from the lens 100 to intensity values of an ideal intensity curve 110.

In FIG. 2, it can be observed that the intensity curve 105 from the lens resembles the ideal intensity distribution curve 110. Curve 105 of the uniform illuminance lens 100 appears almost identical to the ideal intensity curve 110.

Figure 3A:
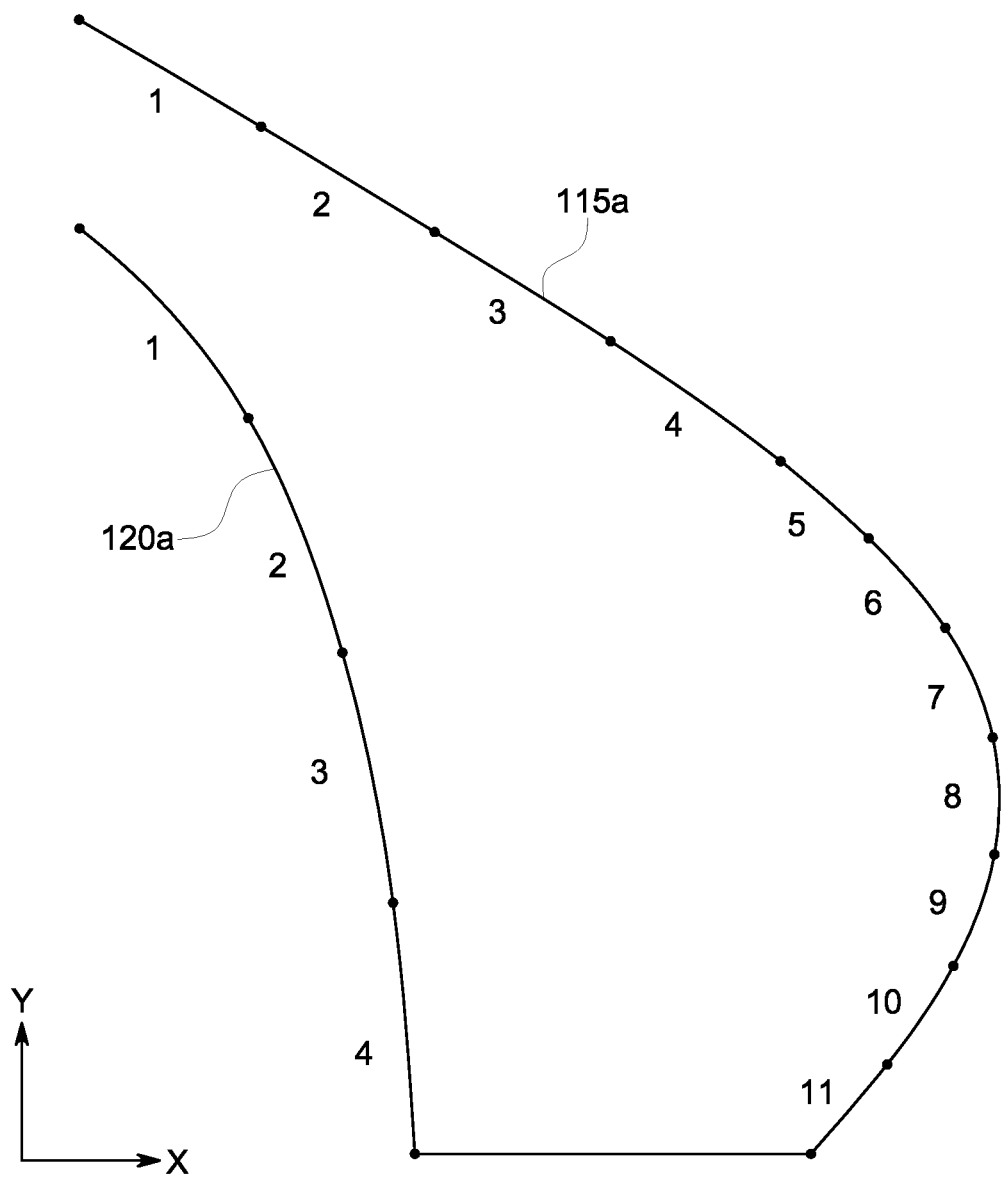
FIG. 3A is an exemplary embodiment of a uniform illuminance lens design in accordance with the present disclosure.
Figure 4A:
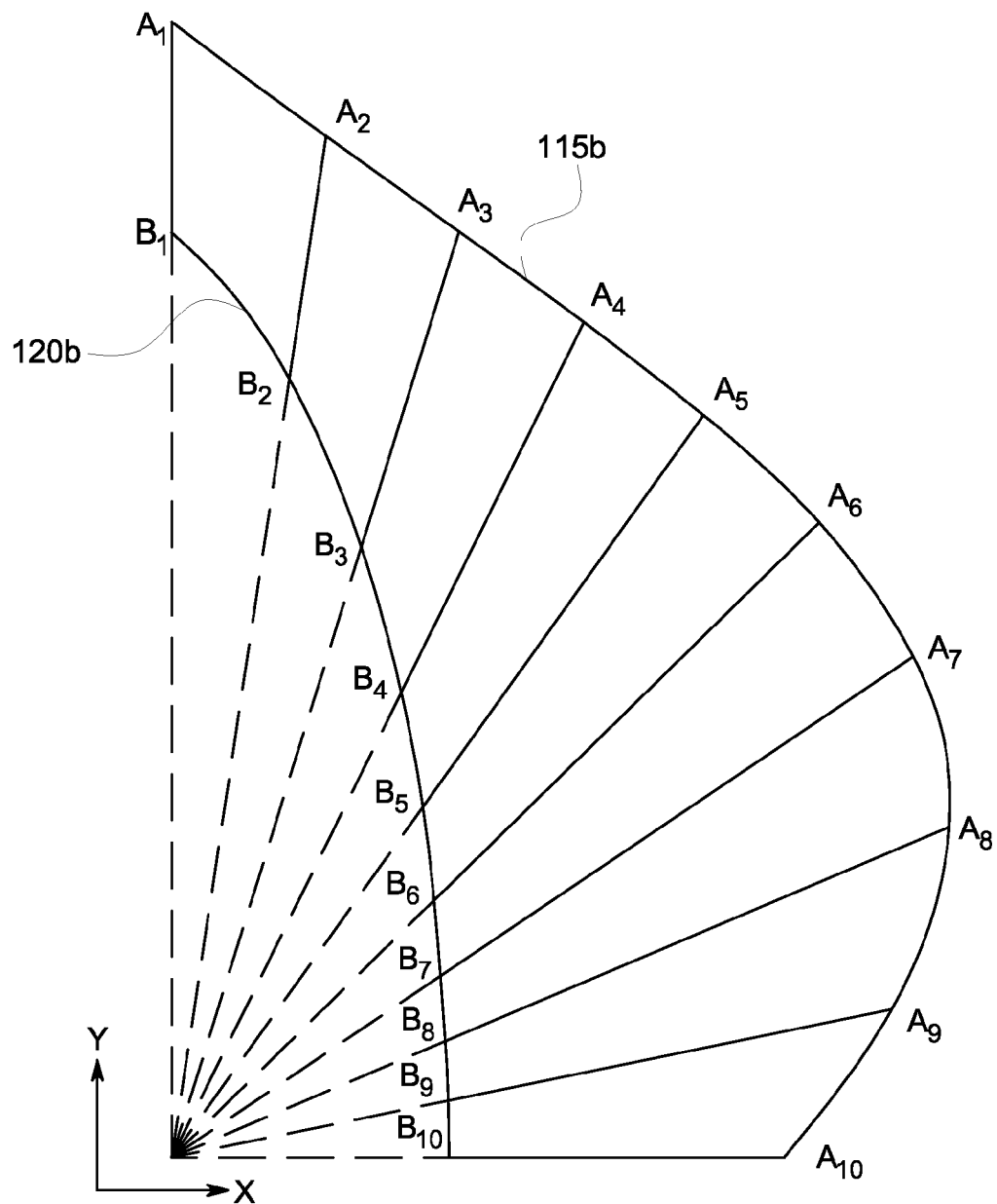
FIG. 4A is another exemplary embodiment of a uniform illuminance lens design in accordance with the present disclosure.
Figures 4B, 5:
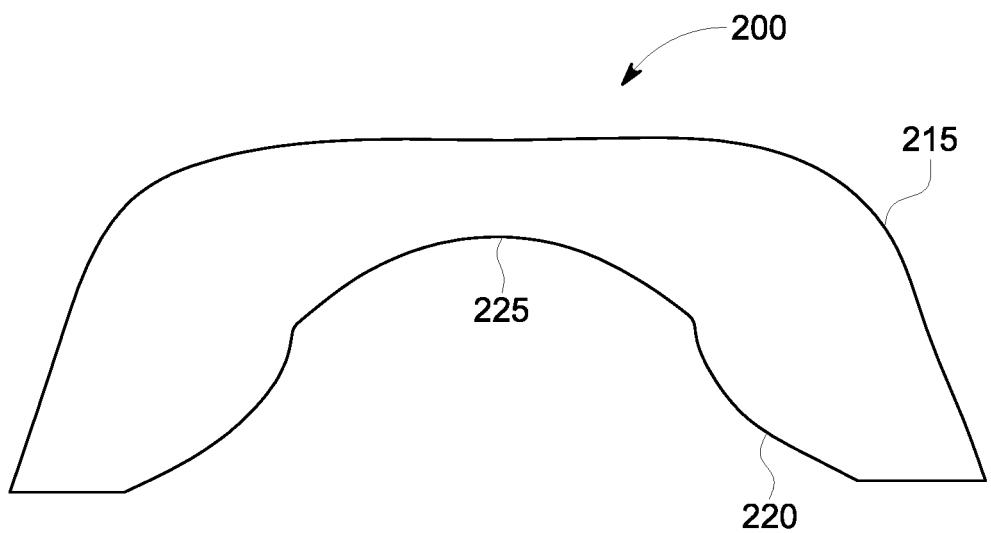
FIG. 4B is an exemplary table of the data for the thickness ratio of the uniform illuminance distribution lens of FIG. 4A.
FIG. 5 is a cross-sectional view of a batwing intensity distribution lens in accordance with the present disclosure.

FIG. 1 is an illustration of a uniform illuminance lens designed according to the piecewise approach of FIGS. 3A-3C or the thickness ratio shown in FIGS. 4A-4B. More specifically, FIG. 1 depicts a cross-sectional profile of uniform illuminance lens 100 comprising an outer surface 115 and an inner surface 120. The outer surface 115 includes a bottom recess 125 for receiving an LED (not shown). In use, the LED will be located in the recess 125.

FIGS. 3A-3C represents plots of half-profiles of an outer surface 115a and an inner surface 120a of the uniform illuminance lens 100 generated using the piecewise approach. The plots are shown in a coordinate system that includes an x-axis and a y-axis. The origin of the coordinate system corresponds to the light source (e.g. an LED). The outer surface 115a and the inner surface 120a are composed of piecewise arcs.

In the embodiment of FIG. 1, the system generates a lens that gives an intensity profile very close to the inverted cosine cube distribution up to 65 degree angle. In FIG. 3A, the lens 100 is formed as a complex curve lens joining piecewise circular arcs. The cross-section profile for the complex curve lens is presented in terms of circular arcs with radii and circle centers. The inner and outer profile combinations of the lens 100 are unique and different from prior art.

In FIGS. 3A-3C, the embodiments select the piecewise approximation to best fit the curve of the inverted cosine cube law. To define the geometry of the cross-section of the lens 100 shown in FIG. 3A, the piecewise approximation divides the inner surface 120a and outer surface 115a into arcs. For example, in FIG. 3A, the system divides the curve into a series of four different arcs on the inside surface 120a and eleven different arcs on the outside surface 115a.

The embodiments provide a process for using a light distribution plot of a uniform illumination curve to determine circular arcs that define the geometry of the lens. The embodiments leverage the circular arc nature of the lens. The embodiments identify circular arcs that form a complex curve and can be used for representing the geometry of the lens. The embodiments include a technique for computing the circular arcs of the lens geometry and exploiting the piecewise circular design curvature.

Each circular arc is defined by a center point and a radius. The computational technique can be used to identify all parameters (both center and radius), which describe each circular arc of which the lens comprises. The components of the lens can then be modeled by the circular arcs.

By representing the lens in terms of the circular arcs of which it is comprised, the lens geometry is determined with a high degree of accuracy. Any known piecewise techniques can be employed for detecting the curves of the complex curves of the lens.

One advantage of using circular arcs for representing the components of the geometry is that less data may be needed to represent the lens with a desired level of accuracy. Thus, use of arcs obtained with the present technique may be a more efficient way to represent lens geometry, because such a representation directly exploits the piecewise circular arc designs of the lens. In the above described embodiments, the technique identifies the circular arcs that coincide with the inverted cosine cube law of the lens.

In an alternative embodiment as shown in FIGS. 4A-4B, a thickness ratio is used to produce the lens geometry based on the inverted cosine cube law. Similarly, in this embodiment, the lens produces uniform illuminance similar to the inverted cosine law.

In FIGS. 4A-4B, a series of cross-sections of the lens in FIG. 1 is shown. Each cross-section is identified by its thickness ratio at its perspective angle. The cross-section of each lens section is defined by a transition surface connecting corresponding portions between any two adjacent lens sections. Each lens section has a unique thickness when the lens sections are molded into a single, smooth continuous lens having an upper surface 115b and a lower surface 120b.

Embodiments of the present invention create a lens based on cross-sections at different angles. The thickness ratio is determined relative to thickness of the cross-section of $A_1$-$B_1$ at a 90 degree angle. In other words, the thickness of all other sections is a comparison to the thickness of section $A_1$-$B_1$, which is located at the center of the lens. The dimensions shown are merely exemplary. For example, the thickness ratio of $A_1$-$B_1$ can be values such as 1, 1.5, or 5, but the thicknesses for all other sections are calculated in comparison to section $A_1$-$B_1$.

Thus, for example, section $A_1$-$B_1$ is characterized by a thickness ratio of 1 taken at a 90 degree angle, section $A_2$-$B_2$ is characterized by a thickness ratio of 1.2206 taken at an 80 degree angle and so one.

It will be understood that while the angles are illustrated at intervals of 10 degrees, design considerations will dictate the sizes of the cross-sections as long as there remains a thickness ratio relationship between section $A_1$-$B_1$ and the remaining sections.

These desired characteristics are provided by a lens having a variation and thickness ratios within the range of +/−10 to 15%, as an example. The precise dimensional ratio chosen within these ranges will depend upon the exact application for the lens.

Using both the piecewise approach and the thickness ratio approach, described above, two more lenses—one producing a medium batwing distribution, and another a flat batwing distribution can be produced.

In FIGS. 5-8, lens 200 provides a standard batwing distribution with a 60 degree cut-off angle. Generally, in a batwing radiation pattern as shown in the polar plot of FIG. 8, the LED produces a beam that is approximately 110 to 120 degrees wide and with the edges brighter than its center so that the LED evenly illuminates within its beam a planar surface that is perpendicular to the axis of the LED.

Figure 8:
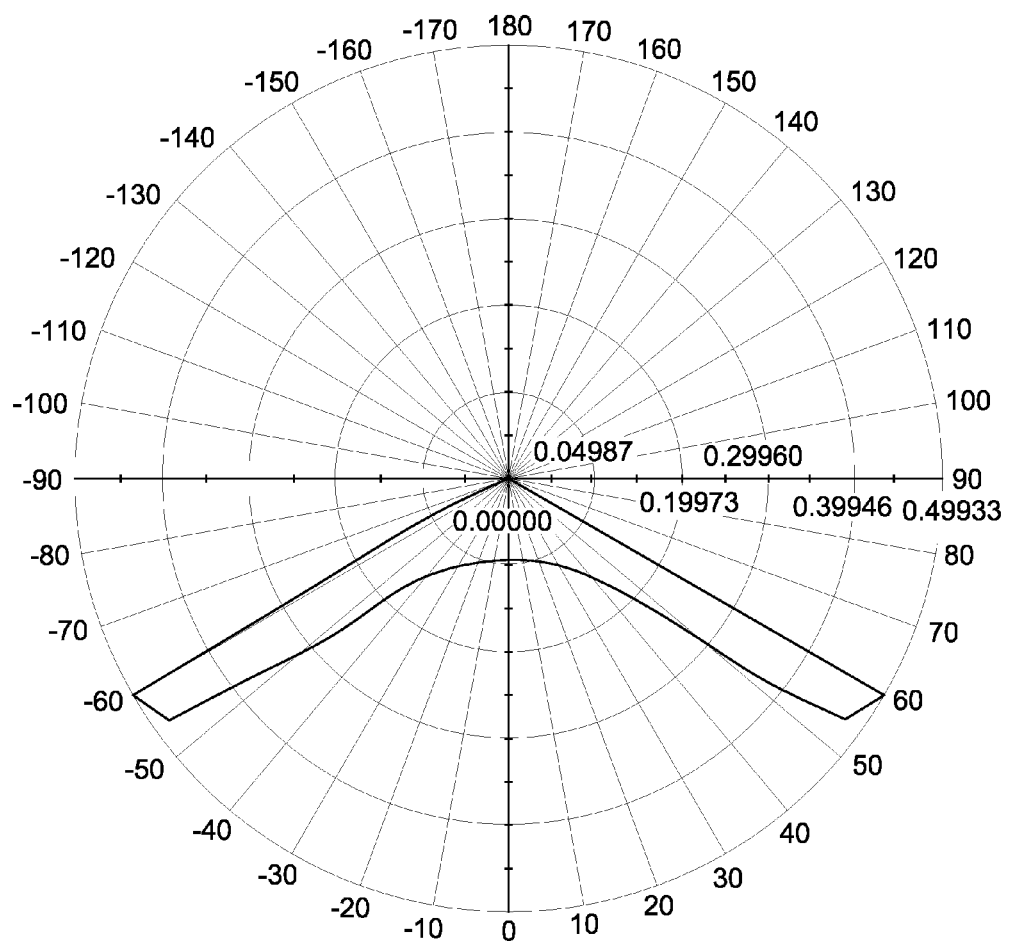
FIG. 8 is a polar plot of the batwing intensity distribution lens of FIG. 5.

The radiation pattern referred to as batwing is "approximately" the inverse cosine cube law. Such a radiation pattern produces even illumination pattern on a planar surface that is perpendicular to the axis of the beam. Such a pattern is named "batwing" because of the shape of a graph of intensity as a function of angle from the axis of the radiation pattern, as shown in FIG. 8. The batwing pattern may be defined by having two roughly equal peaks in a candela distribution plot with a valley between the peaks at about 0 degrees.

Figure 6A:
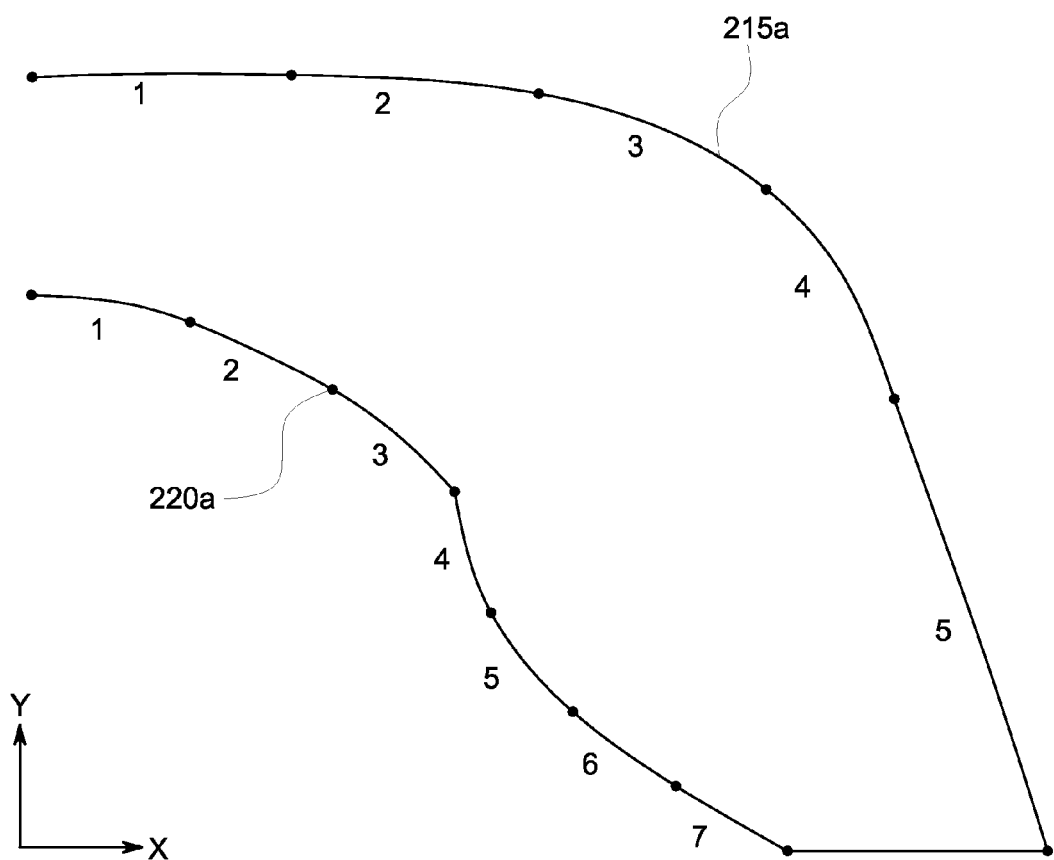
FIG. 6A is an embodiment of a batwing lens design in accordance with the present disclosure.
Figure 7A:
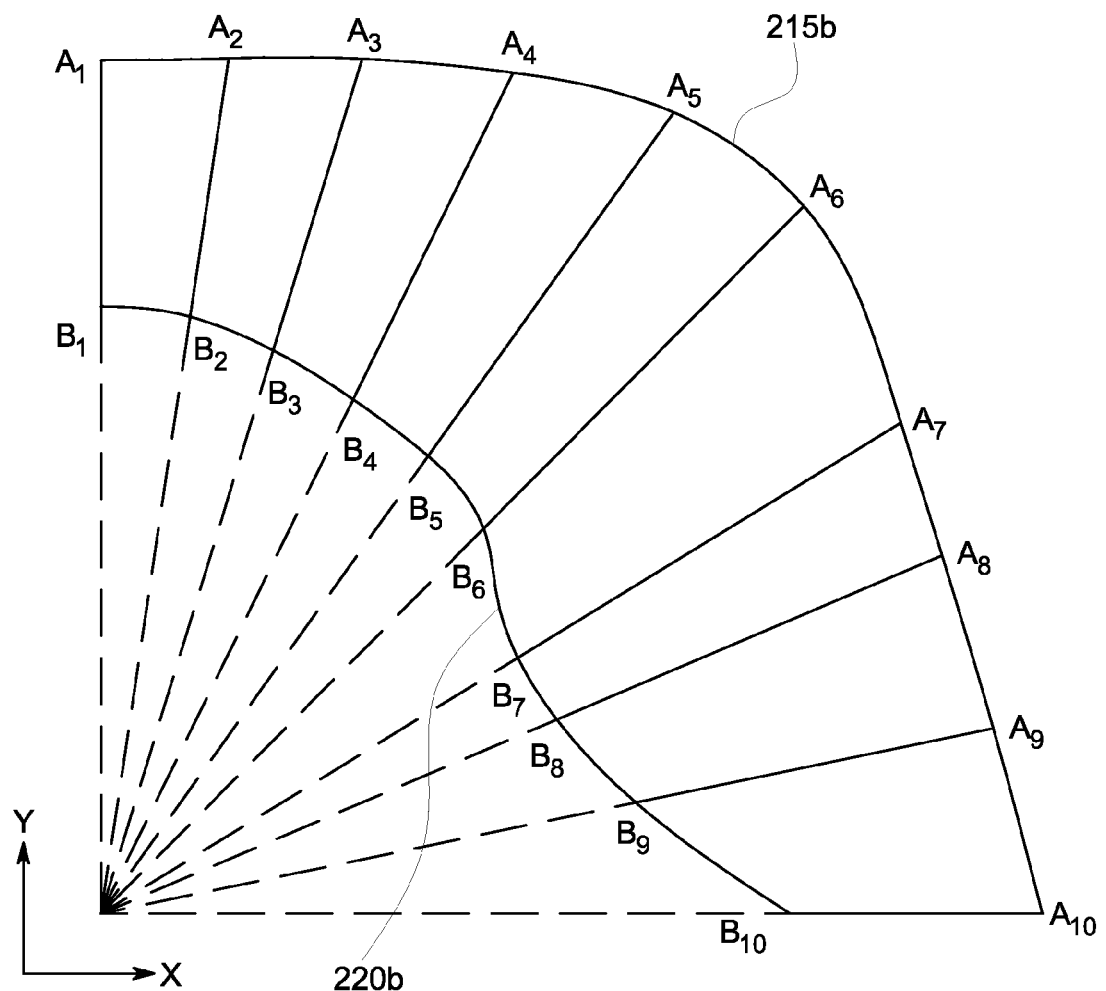
FIG. 7A is another embodiment of a batwing lens design in accordance with the present disclosure.

FIG. 5 depicts a cross-sectional profile of a batwing intensity distribution lens 200 comprising an outer surface 215 and an inner surface 220. The outer surface 215 includes a recess 225 for receiving an LED (not shown). FIGS. 6A-6C is a plot of half-profiles of the outer surface 215a and the inner surface 220a of the batwing intensity distribution lens 200 generated using the piecewise approach, as described above. In FIGS. 7A-7B, the thickness ratio is used to produce the lens geometry having outer surface 215b and inner surface 220b based on the batwing intensity beam pattern, as described above.

In certain flat surfaces applications, the batwing intensity distribution lens 200 (FIG. 5) may be a better choice than the uniform illuminance lens 100 (FIG. 1). Although the batwing intensity distribution lens 200 is not as "perfect" as the uniform illuminance lens, lens 200 is easier and cheaper to produce. As shown in FIG. 1, lens 100 is a thick lens, which can be difficult to mold. Therefore, in applications where deviations from the perfect characteristics of the uniform illuminance lens are acceptable, then the batwing lens 200 can be selected for this application. In addition, the cross-section of the batwing lens 200 does not include sharp points like lens 100. Further, the distances of thickness ratios in FIG. 7B are more uniform, which makes this lens 200 easier to manufacture.

The batwing lens 200 can produce non-uniformity (e.g. areas of hot spots and lower spots). Therefore, in use, lens 200 needs to meet the lower spots minimum requirements. However, this may produce extra light in the hot spots. This is slightly wasteful in terms of energy, because it wastes light by over illuminating the area. From a cost perspective, the batwing lens 200 may be preferred over the uniform illuminance lens 100. However, in some design applications, the customer may not want the areas of hot spots and prefer the perfect illumination of lens 100.

Figure 11A:
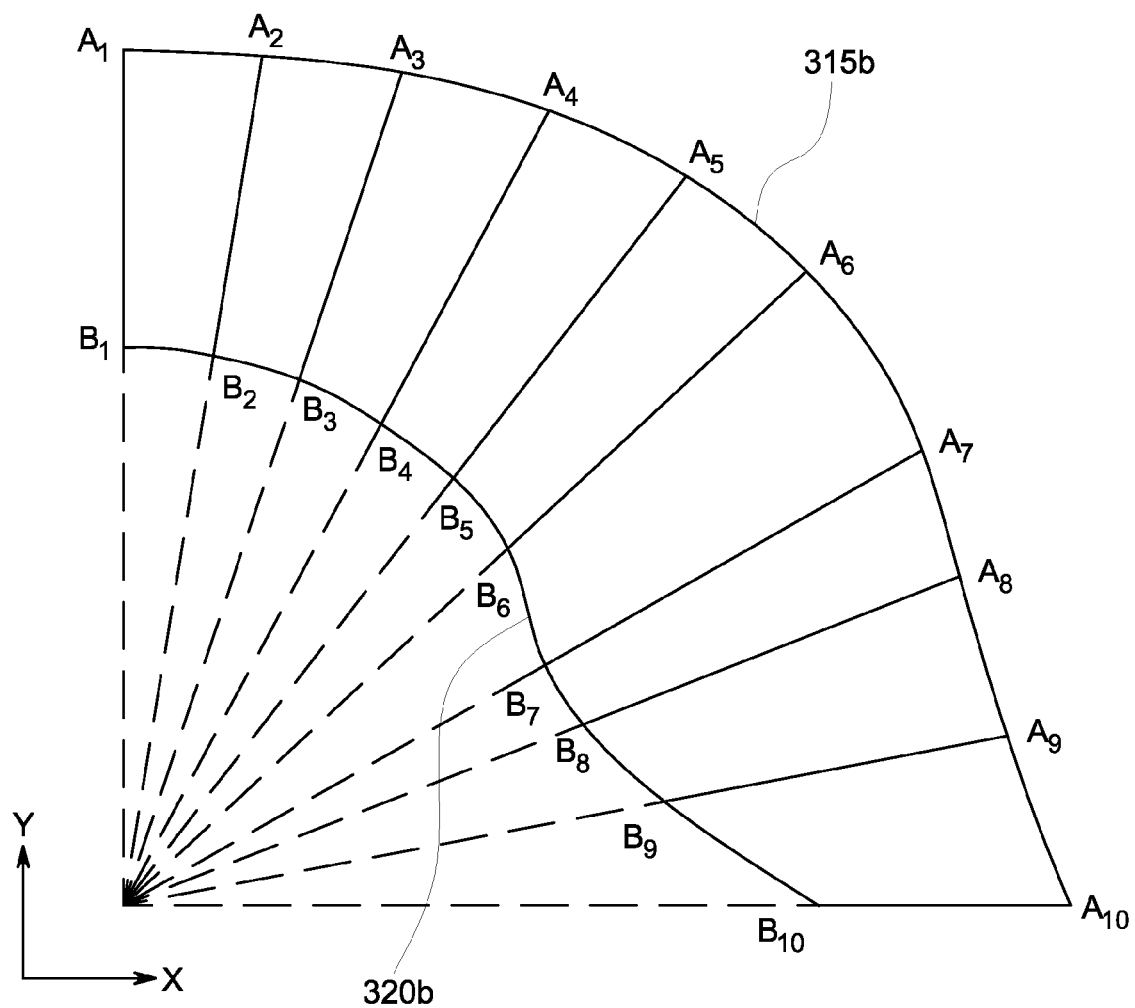
FIG. 11A is another embodiment of a flat batwing lens design in accordance with the present disclosure.
Figure 12:
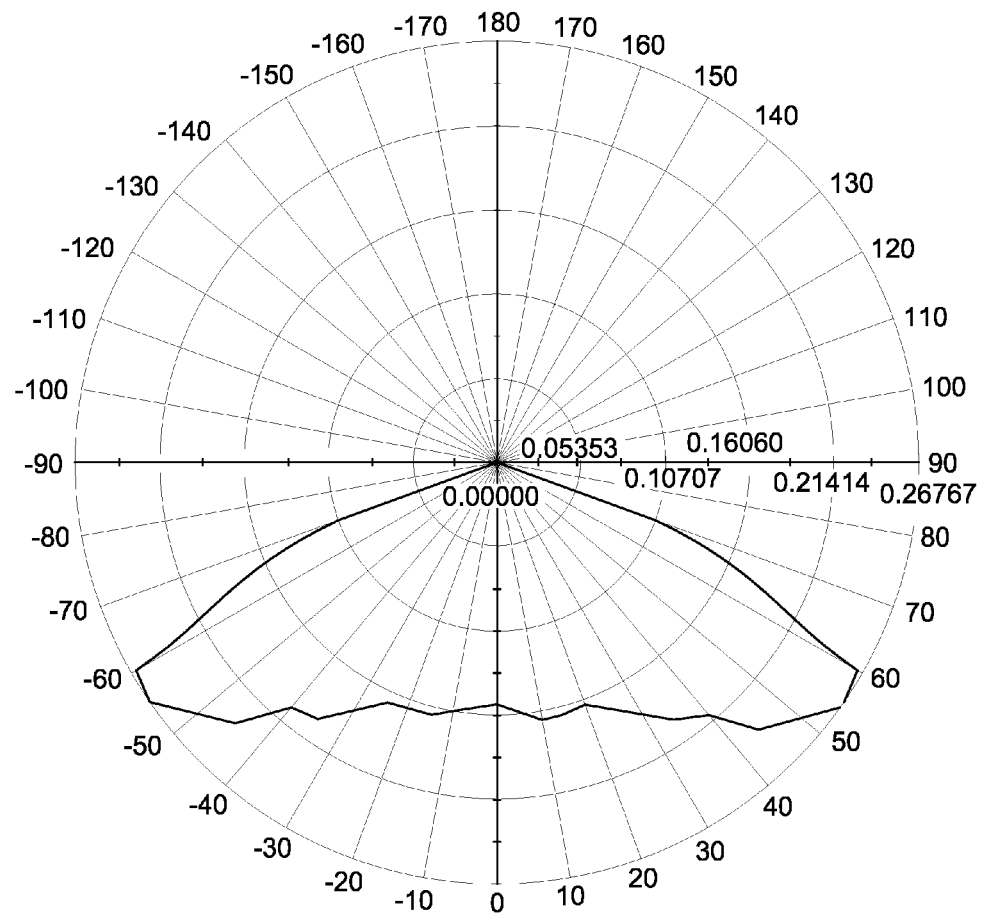
FIG. 12 is a polar plot of the flat batwing intensity distribution lens of FIG. 9.

In a further embodiment shown in FIGS. 9-12, lens 300 provides a flat batwing distribution with a 60 degree cut-of angle. As shown in the polar plot of FIG. 12, the shape of the intensity distribution of the flat batwing 300 is similar to the batwing 200. In FIG. 12, flat batwing pattern is defined by a substantially flat line extending from one maximum peak to the opposing maximum peak.

Figure 10A:
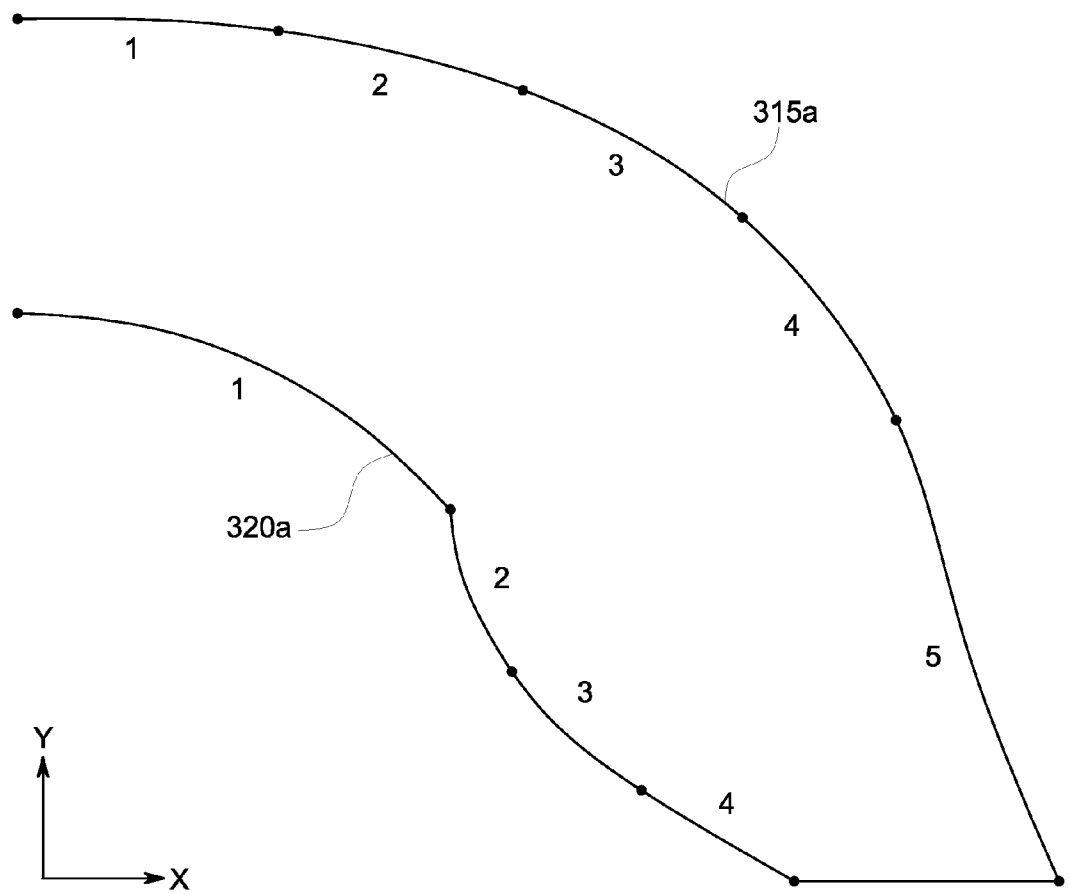
FIG. 10A is an embodiment of a flat batwing lens design in accordance with the present disclosure.

FIG. 5 shows a cross-sectional profile of a flat batwing intensity distribution lens 300 comprising an outer surface 315 and an inner surface 320, resembling the batwing lens 200. The outer surface 315 includes a recess 325 for receiving an LED (not shown). FIGS. 10A-10C is a plot of half-profiles of the outer surface 315a and the inner surface 320a of the flat batwing intensity distribution lens 300 generated using the piecewise approach, as described above. In FIGS. 11A-11B, the thickness ratio is used to produce the lens geometry having outer surface 315b and inner surface 320b based on the batwing intensity beam pattern, as described above.

This flat batwing lens 300 is a more simple design than both the uniform illuminance lens 100 and the batwing lens 200. Lens 300 may be selected as a replacement for conventional fluorescent lights. An advantage over fluorescent lights is better control over the direction of the light. Lens 300 may be selected for use in environments such as factories and shopping centers. Lens 300 may be preferable, because more of the light can be controlled such that it is directed onto the floors and shelves.

In general, each lens in FIGS. 1, 5 and 9 provide or approach uniform illumination, but different distribution schemes. The lenses 100, 200, and 300 are axisymmetric lens, extruded lenses and rotated lenses. The system and method provides axisymmetric lenses in each embodiment. The profile of lenses 100, 200, and 300 is mirrored about the vertical axis and is extruded normal to the profile surface. The profile of each lens 100, 200, and 300 is rotated around the horizontal, as opposed to the vertical axis.

Therefore, the present method can be used to obtain the geometry of the lenses in terms of circular arcs or thickness ratio. Lenses defined as described herein are able to collect distribute light in a controlled manner. Lenses described herein can also produce light intensity distribution that avoids waste.

The lenses 100, 200, and 300 may be made of a material such as acrylic, polycarbonate, and silicone, etc.

Alternative embodiments, examples, and modifications which would still be encompassed by the disclosure may be made by those skilled in the art, particularly in light of the foregoing teachings. Further, it should be understood that the terminology used to describe the disclosure is intended to be in the nature of words of description rather than of limitation.

Those skilled in the art will also appreciate that various adaptations and modifications of the preferred and alternative embodiments described above can be configured without departing from the scope and spirit of the disclosure. Therefore, it is to be understood that, within the scope of the appended claims, the disclosure may be practiced other than as specifically described herein.

We claim:

1. A method for forming a lens, comprising:
   defining a surface of the lens as a combination of interconnected cross-sections;
   wherein (i) one of the cross-sections has a minimum thickness at a first angle along an optical axis and (ii) another one of the cross-sections has a maximum thickness with respect to the minimum thickness, at a second angle along the axis;
   wherein the thickness ratios of each of the other cross-sections is a function of the minimum thickness, each of the other thickness ratios corresponding to a different angle; and
   molding the cross-sections together to form a single lens having a smooth surface.

2. The method of claim 1, wherein the first angle is about 90° and the second angle is about 30°.

3. The method of claim 2, wherein the maximum ratio is about 3;
   wherein additional cross-sections have thickness ratios of about 1.2, 1.6, 2.1, and 2.5 with respect to the minimum thickness, respectively;
   wherein a first of the additional cross-sections is adjacent to the one cross-section, each of the additional cross-sections being adjacent to another of the additional cross-sections; and
   wherein the corresponding different angles are separated by about 10°.

4. The method of claim 3, wherein the thicknesses are responsive to an inverted cosine cube law.

5. The method of claim 4, wherein the inverted cosine cube law is a function of $1/\cos^3 \theta$, where $\theta$ is an angle measured from a vertical direction of the lighting apparatus.

6. A method for forming a lens in lighting apparatus having a substantially uniform illumination distribution, comprising:
   defining a lens for area lighting having an inner surface and an outer surface;
   wherein a profile of the inner surface is composed of a first plurality of piecewise circular arcs;
   wherein a profile of the outer surface is composed of a second plurality of piecewise circular arcs;
   wherein a cross-sectional profile of the lens is a function of the first and second plurality of piecewise circular arcs, each of the first and second plurality of circular arcs (i) being representative of a center point and a radius and (ii) defining a geometry of the lens; and molding the first and second plurality of arcs together to form a single lens having a smooth surface.

7. The method of claim 6, wherein the second plurality of arcs is a larger quantity than the first plurality of arcs.

8. The method of claim 7, wherein radii associated with each of the first plurality of arcs ranges from about 2.5 to 400; and wherein radii associated with each of the second plurality of arcs ranges from about 7 to 27.

9. The method apparatus of claim 7, wherein radii associated with each of the first plurality of arcs ranges from about 3 to 41; and wherein radii associated with each of the second plurality of arcs ranges from about 2.6 to 15.

10. The method of claim 6, wherein the first plurality of arcs is a larger quantity then the second plurality of arcs;

wherein radii associated with each of the first plurality of arcs ranges from about 5 to 30; and wherein radii associated with each of the second plurality of arcs ranges from about 2.5 to 12.6.

11. The method of claim 6, wherein each center point and radius is different from all of the other center points and radii.

12. The method of claim 11, wherein the profiles are responsive to an inverted cosine cube law.

13. The method of claim 12, wherein the inverted cosine cube law is a function of $1/\cos 3\theta$, where $\theta$ is an angle measured from a vertical direction of the lighting apparatus.

* * * * *